235-379 SR
8/26/80 OR 4,219,151

United States Patent [19] [11] 4,219,151
Haruki [45] Aug. 26, 1980

[54] CARD VERIFICATION SYSTEM USING STORED FUNCTIONS

[75] Inventor: Takanobu Haruki, Takatsuki, Japan

[73] Assignee: Omron Tateisi Electronics, Co., Kyoto, Japan

[21] Appl. No.: 24,422

[22] Filed: Mar. 27, 1979

[30] Foreign Application Priority Data

Apr. 26, 1978 [JP] Japan .................................. 53/50649

[51] Int. Cl.[2] ......................... G06F 15/30; G06K 5/00
[52] U.S. Cl. ...................................... 235/379; 235/380
[58] Field of Search ............... 235/379, 380, 381, 382; 340/149 A

[56] References Cited

U.S. PATENT DOCUMENTS

| | | | |
|---|---|---|---|
| 3,588,449 | 6/1971 | Paterson | 340/149 A |
| 3,665,162 | 5/1972 | Yamamoto et al. | 235/380 |
| 3,702,392 | 11/1972 | St. Jean | 235/380 |
| 3,740,530 | 6/1973 | Hoffer et al. | 235/380 |
| 3,794,813 | 2/1974 | Spetz | 340/149 A |
| 3,905,461 | 9/1975 | Davies et al. | 194/4 C |
| 4,016,405 | 4/1977 | McCune et al. | 235/380 |

*Primary Examiner*—Daryl W. Cook

*Attorney, Agent, or Firm*—Stevens, Davis, Miller & Mosher

[57] ABSTRACT

A verification system for determining whether a person is authorized to use a connected system is disclosed as comprising reading means for reading first data from a card proffered by the person who intends to use the connected system, input means manually operable by the person to enter second data into the verification system, the second data being different from the first data, function storage means for storing a plurality of different functions, each having at least one variable, and, in response to an address code formed from a portion of at least one of the read first data and the entered second data, for looking up and generating a specific stored function, calculating means for substituting a remaining portion of at least one of the first and second data into the variable of the generated specific function and for calculating a value from said function, and checking means for checking whether a predetermined relationship exists between a further remaining portion of at least one of the first and second data, and the calculated value, the existence of said predetermined relationship being operative to allow the person to use the connected system.

7 Claims, 7 Drawing Figures

CARD VERIFICATION SYSTEM USING STORED FUNCTIONS

BRIEF DESCRIPTION OF THE INVENTION

The present invention relates to a verification system, and more particularly to a verification system which ascertains whether the holder of a card is an authorized person to use the card in a card operated apparatus.

Heretofore, several approaches have been suggested to ensure that the holder of a card is an authorized user. One such approach was to compare directly a coded secret number as read from an identification card with a secret number entered via a keyboard. When a predetermined coincidence was found, the user of the card was allowed access to various facilities such as a cash dispenser in a banking system, an article dispenser, or a security gate or the like to which only authorized persons were permitted access. This approach, however, was found inadequate in that a stolen card or a card otherwise illicitly in the possession of a third party could be utilized in the event he knew confidential information about the encoding of the coded secret number on the card, since the secret number as read from the card was directly compared with the actually entered secret number. Such unauthorized use might be prevented by making the encoding of secret numbers rather complicated, but this too was unsuccessful because even complicated encoding could be deciphered by reference to various codes on many cards.

To inhibit the unauthorized use of a card on which the secret number itself is recorded, another approach has been proposed in the banking field in which each card carries an account number rather than a coded secret number. This approach requires a memory store for storing all possible secret numbers representative of account numbers of all customers, an addressor for addressing the store means by an account number read from the card, means for generating a unique secret number representative of the account number, and a comparator for comparing the generated secret number with a secret number manually entered through a keyboard by the card holder for the purpose of ascertaining whether the card holder is an authorized user. This system avoids the problem of a secret number becoming known by third persons from an identification card since the card does not carry the secret number. But, a large storage capacity is needed to store all secret numbers, each corresponding to a respective customer's account number thus requiring the system to rely upon a central computer with a large storage capacity. During off-business hours such as night or holidays when the central computer does not operate in the on-line mode, a transaction terminal such as an automatic cash dispenser in banking systems is also expected to operate in the off-line mode for customer service. However, the just described verification systems, requiring a central computer are unable to operate in the off-line mode because they need the information stored in the central computer. To overcome this disadvantage, a system is required having a large storage capacity incorporated into either a terminal controller in each bank branch office which controls transaction terminals in that office or in each individual transaction terminal. Since each terminal controller or transaction terminal of the branch office should be of a sufficiently large capacity to store all secret numbers of every customer who has his account in the branch office such systems become very expensive while still presenting difficulties if a card holder attempts to use a transaction terminal in a branch office other than his own.

To make it possible to use terminals in other branch offices in the foregoing system, the terminal controller in each bank branch or every transaction terminal should have an extra storage capacity for storing the secret numbers assigned to all customers of all other branches, but this, of course, is more expensive and impractical.

It is, therefore, a primary object of the present invention to provide a verification system having a smaller storage capacity which can ascertain whether the holder of an identification card is an authorized user and in which non-authorized users cannot decipher from the card a secret number which is manually entered via a keyboard by the authorized user.

It is another object of the present invention to provide a verification system which includes a storage means for storing a plurality of predetermined functions each having at least one variable and a comparision means for comparing a value of the function determined by data from the identification card and/or a keyboard with other data from the card and/or keyboard, thereby making sure that the card holder is an authorized user.

It is another object of the present invention to provide an inexpensive verification system applicable to the banking industry which is operable in the off-line mode.

According to one aspect of the present invention, a verification system is provided for determining whether a person is authorized to use a facility. The verification system comprises reading means for reading first data from a card held by the person who intends to use the facility, input means manually operable by the person to enter second data into the verification system, the second data being different from the first data, function storage means for storing a plurality of different functions, each having at least one variable, and means responsive to an address code formed from a portion of the first data read or of the second data entered, or of both, for generating a specific function, calculating means for substituting a first remaining portion of the first or the second data, or both, not used to form said address code with the variable of the generated specific function for calculating a value, and checking means for checking whether a predetermined relationship exists between a second remaining portion of the first or of the second data, or of both, not used to form said address code, and the calculated value, the existence of said predetermined relationship being operative to enable a person to use the facility.

BRIEF DESCRIPTION OF THE DRAWINGS

These and other objects and numerous advantages of the verification system according to the present invention will become apparent from the following detailed description of the invention taken in conjunction with the accompanying drawings, in which.

DETAILED DESCRIPTION

Figure 1:
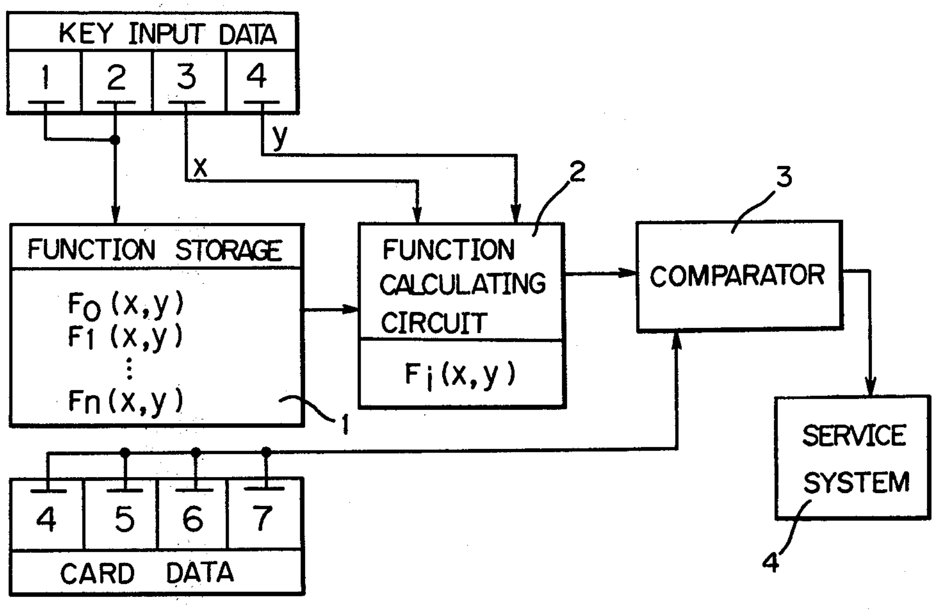
FIG. 1 is a block diagram showing a verification system embodying one of the operating principles of the present invention.

FIG. 1 shows one embodiment of a verification system constructed according to the principle of the present invention. A function storage 1 stores a plurality of different functions $F_0(x, y)$, $F_1(x, y) \ldots F_n(x, y)$ each of which has two variables x and y, respectively. Assuming that card data are recorded on an identification card as "4567" and key input data are manually entered via a keyboard by the user of the card as "1234", the first two digits "12" of the key input data are applied to the function storage 1 as a memory address and the storage 1 looks up and generates a corresponding function $F_i(x, y)$ which is in turn applied to a function calculating circuit 2. In the function calculating circuit 2, the function $F_i(x, y)$ is calculated using the last two digits "34" of the key input data as the function variables, i.e., $x=3$ and $y=4$. The calculation result of the function is compared with the card data "4567" in a comparator 3 to check whether or not they are in a predetermined relation. An affirmative answer allows the card user to use a service system 4 which is connected to the verification system.

According to the principle of the present invention as shown in FIG. 1, a portion of the key input data is applied to the function storage 1 as a memory address with the remaining portion or the key input data not used in the memory address being substituted as the variables of the function generated from the storage 1 to calculate a function value. As an alternative arrangement, a portion of the card data may provide the memory address for the storage 1 to generate a function with the remaining portion of the card data being substituted as the variables of the generated function in the function calculation. In this alternative arrangement, the calculated value is then compared with the key input data to check whether there is a predetermined relationship between them. As another alternative, the card data may be replaced by an account number of the card user, but in this case predetermined data representative of a value of a function determined by the account number must be assigned to the card user without his choice at the time the card is issued which is used as key input data entered by the user through the keyboard.

Figure 2:
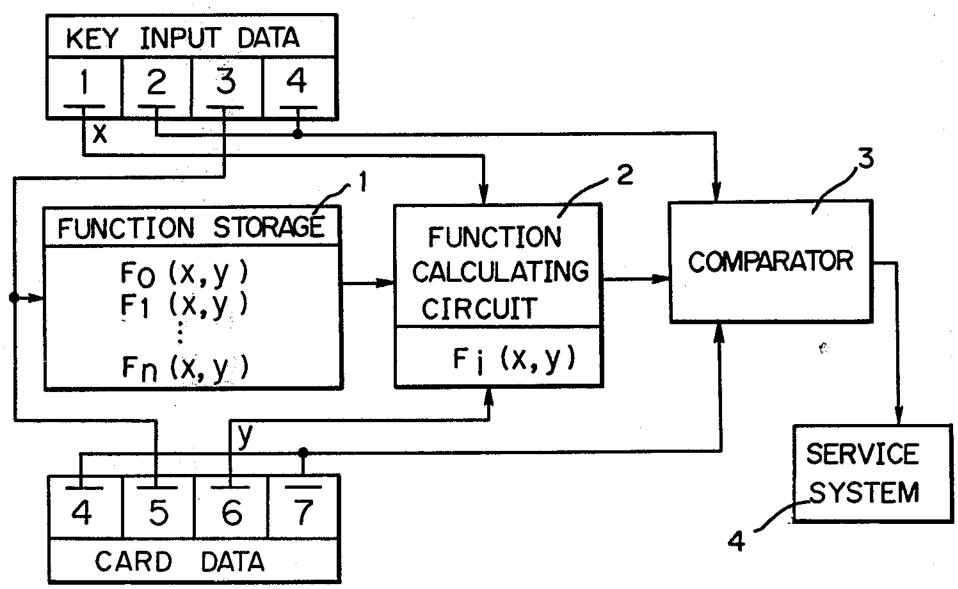
FIG. 2 is a block diagram showing a verification system embodying another principle of the present invention.

FIG. 2 shows another preferred embodiment of a verification system in accordance with another operating principle of the present invention. In this embodiment, the function storage 1 is addressed by "3" on the third digit of the key input data and "5" on the second digit of the card data. A specific function $F_i(x, y)$ derived from the addressed storage 1 has the variables x, y respectively substituted by the "1" occurring at the first digit of the key input data and the "6" at the third digit of the card data. A value of the specific function $F_i(x, y)$ when $x=1$ and $y=6$ is calculated in the function calculating circuit 2. The calculated value of the function is compared with the remaining data at the second and fourth digits of the key input data and the first and fourth digits of the card data in the comparator 3 to check whether a predetermined relation exists between the calculated value and the remaining data. If so, the service system 4 is operable manually by the card user. From the foregoing description about the principles of the present invention and with the accompanying drawings FIGS. 1 and 2, it will be understood that a verification system is provided in which a predetermined plurality of different functions, each having at least one variable, are stored in the function storage means, the function storage means is addressed by a part of the card data and/or the key input data to look up and generate a corresponding specific function, the variables of the specific function are substituted by a remaining part of the card and/or the key input data to calculate a value of the substituted function, the calculated value is compared with a further remaining part of the card data and/or the key input data to ascertain whether a predetermined relationship exists between them, and the card user is identified as an authorized user when the predetermined relationship exists.

According to the present invention, a customer's card does not bear the key input data itself which manually entered into the verification system by the customer. The card data read from the card as first data and the key input data manually entered on a keyboard as second data are compared with each other through the intermediary of the function storage means to check whether a predetermined relationship exists between the first and second data, so that the system effectively prevents an unauthorized person from anticipating the key input data from the card data. A function storage means capable of storing between 10 and 100 functions can provide the verification system with a high degree of security and prevent unauthorized persons from fraudulently using the card. And, the function storage does not need a large storage capacity. Accordingly, it is easy to provide each bank transaction terminal, such as an automated cash dispensing machine, or each terminal controller of each branch of a bank, or the like, with the verification capabilities of the present invention, with the verification system being operative and equally effective regardless of whether the bank transaction terminal is on or off-line.

Another embodiment of the present invention will be explained referring to FIGS. 3 to 7. This embodiment uses a verification system in a banking system which consists of a central computer 12, and terminal systems 5, 6 and 7, each of which is installed in a respective bank branch office and connected to the computer 12 via a proper cable. Each of the terminal systems, 5 being representative, includes as bank transaction terminals an automatic cash dispenser 8, an automatic cash depositer 9, and a multiple transaction terminal 10. Each terminal system also includes a terminal controller 11 with the transaction terminals 8, 9 and 10 transmitting or receiving data to or from the computer 12 in the on-line mode via the terminal controller 11.

Figure 3:
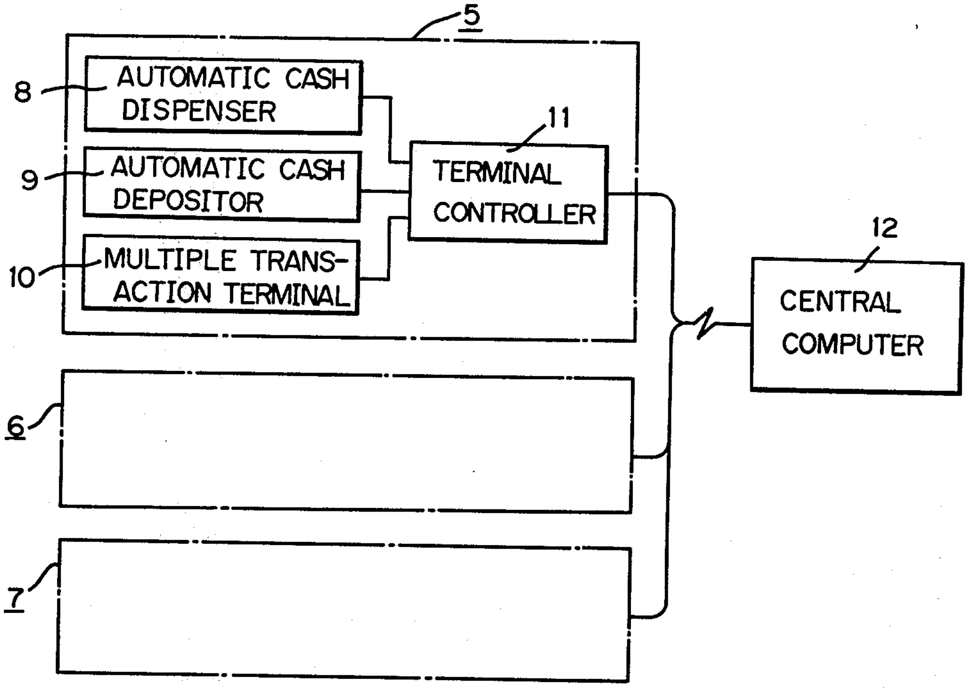
FIG. 3 is a block diagram showing a banking system including the verification system according to the present invention.
Figure 4:
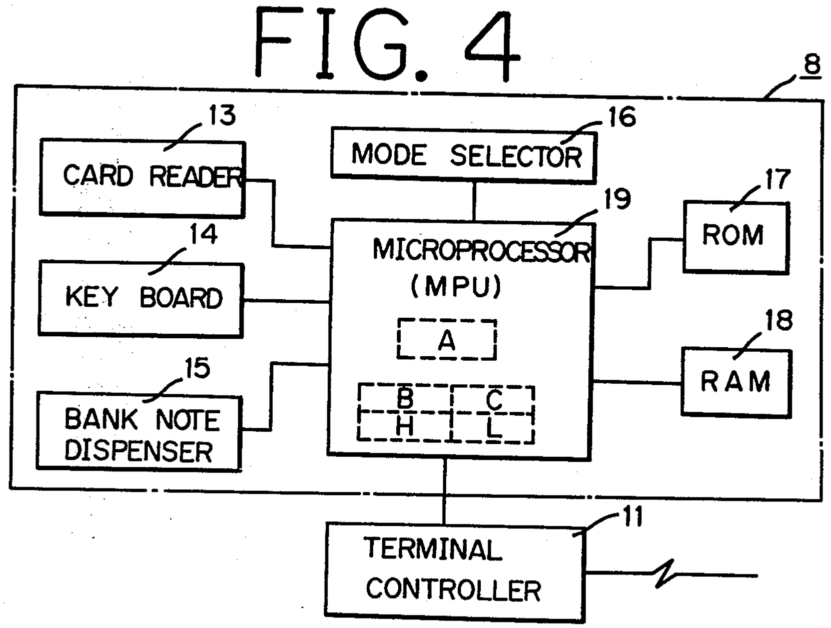
FIG. 4 is a block diagram showing the automatic cash dispenser and the terminal controller associated therewith shown in FIG. 3.

FIG. 4 shows in greater detail the construction of the automatic cash dispenser 8 of FIG. 3 which includes a verification system in accordance with the present invention. The cash dispenser 8 is controlled by a microprocessor 19 which in turn is connected to a card reader 13 for reading card data from a card proferred by a card holder, a keyboard 14 on which the card holder manually enters key input data, a bank note dispenser 15, and a mode selector 16. The selector 16 switches the mode of operation between the on-line and off-line modes. The microprocessor 19 contains an accumulator A and working registers B, C, H and L and controls data operations such as input, output, transmission, calculation, comparison, etc. In accordance with a program stored in a read-only memory (hereinafter, ROM) 17. The data read by the card reader 13 and entered through the keyboard 14 are loaded into a random access memory (hereinafter, RAM) 18. The RAM 18 also stores a plurality of different functions thus serving as the function storage means described above. The microprocessor 19 is connected to the terminal controller 11 and exchanges data with the central computer 12 via the terminal controller 11 when the dispenser 8 is in the on-line mode, i.e., the mode selector 16 is set to the on-line mode.

Figure 5:
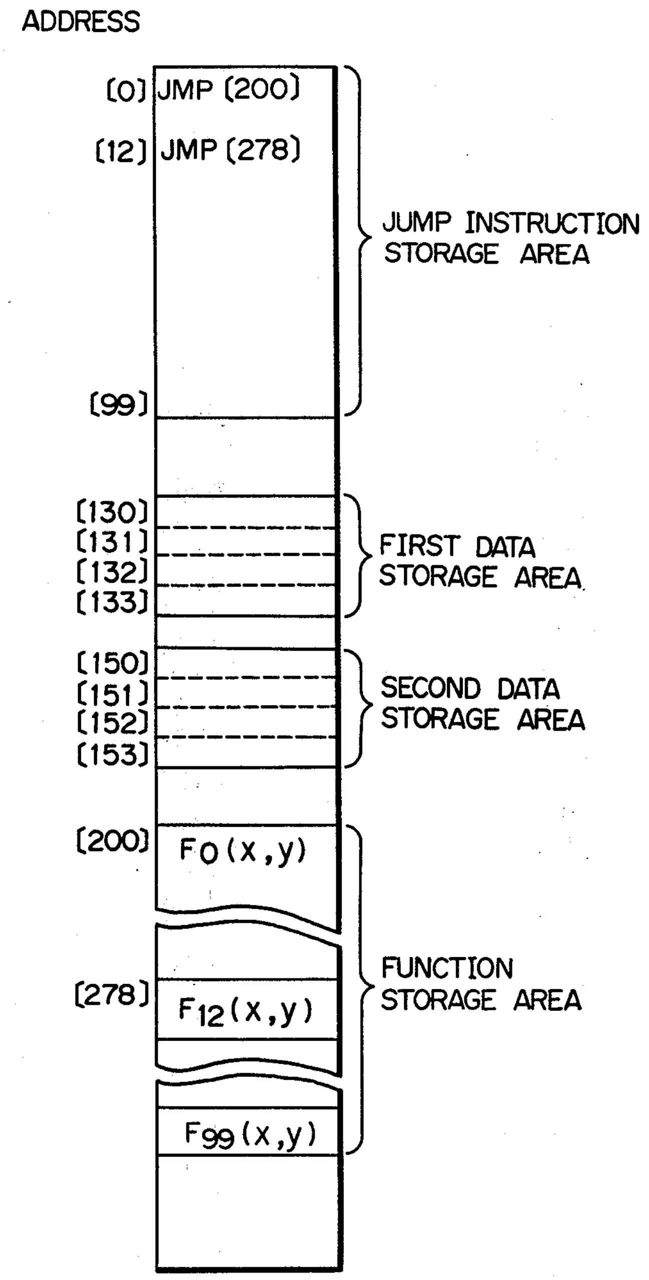
FIG. 5 is a detailed representation of a RAM shown in FIG. 4 illustrating representative memory locations.

FIG. 5 shows a repesentative storage location in the RAM 18 of FIG. 4. Addresses [0 ] to [99 ] store jump instructions for function addressing. Although decimal notation is used for simplicity of explanation, the brackets indicate that the true address is in a binary digit notation. Addresses [130] to [133] store the data read from the card as first data, addresses [150 ] to [153] store the data manually entered through the keyboard as second data, the succeeding addresses from [200] store 100 different functions $F_0(x, y)$ to $F_{99}(x, y)$. The memory locations of RAM 18 shown in FIG. 5 are, of course, illustrative only and may be freely modified to other locations as desired.

Figure 6:
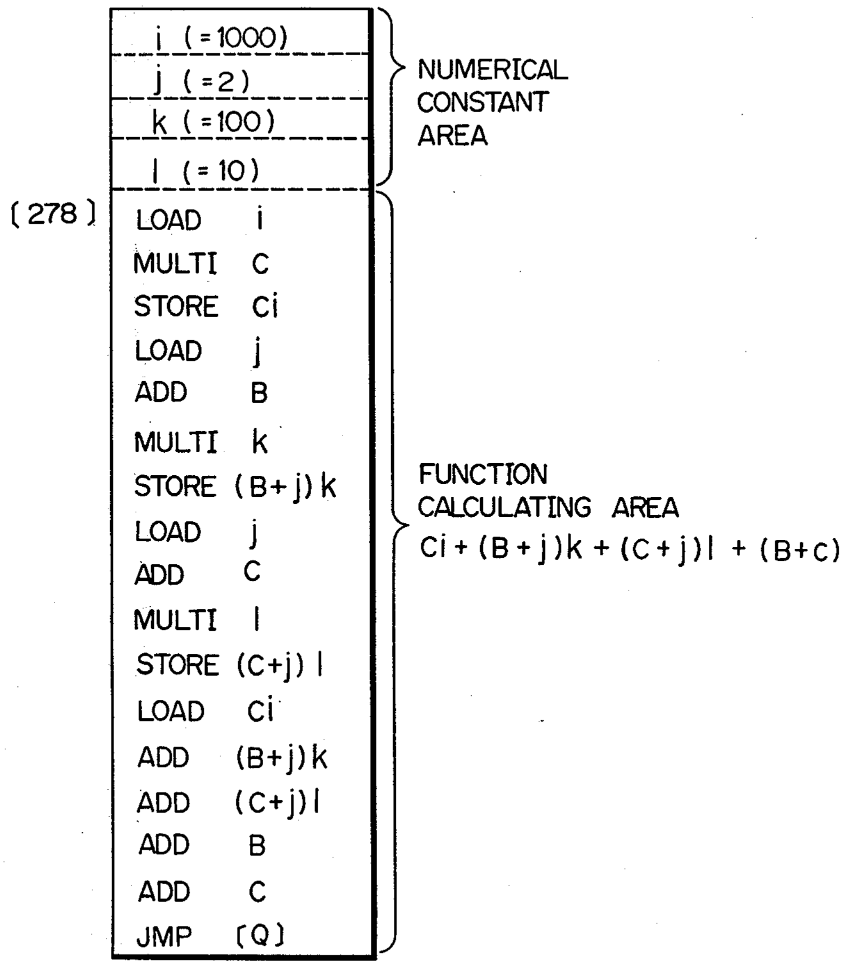
FIG. 6 is a further detailed representation of the RAM shown in FIG. 4 illustrating the status of a representative stored function program therein.

FIG. 6 shows the storage status of the function $F_{12}(x, y)$ stored in the RAM 18. A representation of the function $F_{12}(x, y)$ is stored in the addresses beginning from address [278], and constants for use in the function representation are stored in four address locations preceding address [278].

Figure 7:
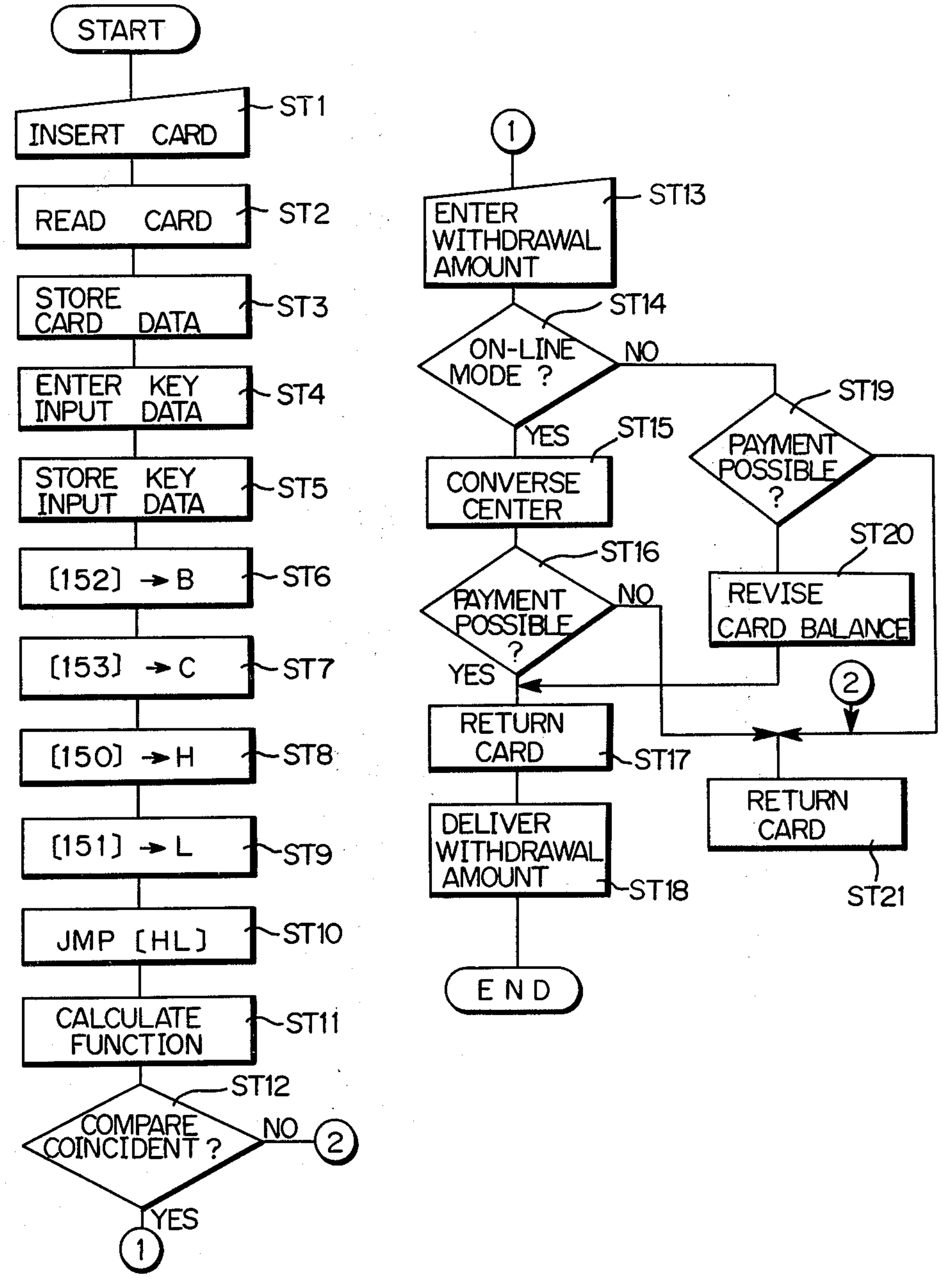
FIG. 7 is a flow chart of events occurring within the automatic cash dispenser according to the present invention.

The present embodiment will be hereinafter explained with accompanying drawing FIG. 7 showing a flow chart of the operation of the automatic dispenser 8. The FIG. 7 flow chart represents the main program stored in ROM 17.

When the customer of a banking office places his card such as an identification card, cash card, credit card, or the like into the dispenser 8 (the step ST1 in FIG. 7, hereinafter steps will be identified by the prefix ST followed by a number), the card reader 13 accepts and reads the loaded card (ST2). The card data read by the card reader 13 is stored in a predetermined area of the RAM 18 under the control of the microprocessor 19 (ST3) operating in accordance with its operating program stored in ROM 17. On the card there are recorded at least first data in the form of four decimal digits for identifying the customer. Although four decimal digits are used for purposes of explanation here and below, other numbers of digits can also be used. Other information such as an account number, off-line balance, branch code, etc. can also be contained on the card. The data at each digit location of the first data read from the card is loaded into the addresses [130] to [133] of the RAM 18 on a digit-by-digit basis, and also the other or remaining data of the first data is stored in a selected area of the RAM 18.

Subsequently, the customer manually enters via the keyboard 14 second data in the form of four decimal digits for providing the identity of the customer (ST4), the second data being different from the first data as noted earlier. The data at each digit location of the second data entered on the keyboard is respectively stored into the addresses [150] to [153] of the RAM 18 on a digit-by-digit basis under the control of the microprocessor 19 (ST5).

The present embodiment will be explained in accordance with the principles of the present invention shown in FIG. 1 to provide a better understanding. Data is transferred from the address [152] of the RAM to the general purpose register B (ST6) and data is transferred from the address [153] into the general purpose register C (ST7). Subsequently, data is transferred from the address [150] into the working register H (ST8), and data at the address [151] is transferred into the working register L (ST9).

To gain access to a predetermined function, the operating sequence jumps to the address determined by the data loaded in the registers H and L (ST10). Accordingly, the microprocessor 19 switches from the control under the main program stored in the ROM to the control under a function program stored in the RAM 18 at location [HL]. Thus, a function is addressed by the data on the first and second decimal digits of the second or keyboard data. Since the data stored at the addresses [150] to [153] are binary coded decimal notation codes (hereinafter BCD codes), the jump is performed after transferring the data from the registers H and L into binary digits for use as a memory address.

In other words, if the second data, e.g., keyboard data, is "1234" as shown in FIG. 1, the data stored in the registers H and L which are combined to form a single register are "12" and the microprocessor operation sequence will jump to the address [12] of the RAM 18 in step ST10. At the address [12] there is stored "JMP[278]", i.e., an instruction that a sequence should jump to the address [278]. Accordingly, the microprocessor 19 executes this instruction, causing the sequence to skip to the address [278] storing the function $F_{12}(x, y)$. An expression of the function is stored in operational instruction words in the addresses following [278], and constants which are used in the function $F_{12}(x, y)$, i.e., i, j, k, l (corresponding to 1000, 2, 100, 10 respectively) are stored in BCD codes in the storage area preceeding the address [278].

Since the registers B and C were loaded with the third and the fourth digits of the second data "1234" as variables in the step ST6 and ST7, it will be understood that B=3 and C=4. That is, B and C correspond to x and y respectively.

The contents of the expression of the funtion $F_{12}(x, y)$ stored at the address beginning at location [278] is $$F_{12}(B,C)=Ci+(B+j)k+(C+j)\,l+B+C$$

If the values i, j, k, l are substituted by the constants stored at the locations preceeding location [278] and the values B and C are taken as the contents of the B and C registers, under the control of the microprocessor 19, the following value of the function is obtained:

$$F_{12}=4\times 1000+(3+2)\times 100+(4+2)\times 10+(3+4)=4567$$

Numerical values determined during calculation of Ci, (B+j)k, and (C+j)l, and the calculated value of the function "4567" are all stored at a proper working area in the RAM 18. Subsequently, by an instruction JMP (Q) the microprocessor 19 returns to the main program stored in the ROM 17. [Q] merely represents the address to which the main program returns. In practice, a binary address location would be specified. The instruction JMP [Q] allows the microprocessor 19 to move from the control by the functional program stored in the RAM 18 back to control by the main program stored in the ROM 17.

In step ST12, the function value stored in the working area of RAM 18 is compared with the first data from the card which is stored at the addresses between [130] and [133] of the RAM 18 under the control of the microprocessor 19. If a predetermined relationship does not exist, in this embodiment this means coincidence in value, between the value of the function stored at a working area of the RAM 18 and the first data read from the card, the card reader 13 drives the card backwards to return it to the customer (ST21), thereby ending the sequence shown in FIG. 7.

The existence of a predetermined relationship in the present verification system being between the function and first data allows the customer to proceed with a further operation in the automatic cash dispenser 8. The customer then, when requested, enters a withdrawl amount via the keyboard 14 which is stored in the RAM 18 (ST13). The microprocessor 19 checks whether or not the mode selector 16 stands in the on-line mode (ST14).

During the on-line mode and business hours, data such as the account number and the requested withdrawl amount are transmitted to the computer 12 via the terminal controller 11, so that the computer 12 transmits to dispenser 8 a signal indicating whether the requested payment is acceptable or not (ST15). The signal transmitted from computer 12 via controller 11 is stored in a working area of RAM 18, and the microprocessor 19 judges whether the payment is possible (ST16). If not, the card reader 13 returns the card to the customer (ST21), terminating the transaction with the customer. Conversely, if cashing is effected, the reader 13 returns the card (ST17), and the back note dispenser 15 delivers the bank notes corresponding to the value information stored in the RAM 18 (ST18).

When the off-line mode is used, such as after business hours, the sequence proceeds from step ST14 to step ST19. In the step ST19, the requested withdrawl amount in the RAM 18 is compared with the off-line balance, i.e., card balance, which is recorded on the card, and a decision is made whether the payment mode is possible. A "NO" response from step ST19 causes the operation sequence to preceed to step ST21 causing the card to be returned. A "YES" response from ST19 causes the operation sequence to proceed to the step ST20 where the card balance is revised. Thereafter, the withdrawl transaction with the customer is terminated after the subsequent sequences of returning the card (ST17) shown in FIG. 7.

The present invention is not limited to the above embodiments as various other modifications are possible; exemplary of such modifications are the following:

A. A predetermined relation between the first data read from the card and the value of the function substituted by the second data on comparision may be implemented as a coincidence relation, a complemental relation, or a relation that the sum or difference of both equals a predetermined value under the condition that the first data and the value of the substituted function are numerical values.

B. A value of sum of the values on the first and second digits in one of the first and second data may be used as a memory address for a specific function. For example, if ten different functions are stored in the function storage, and the second data includes "7" on the first digit and "8" on the second digit, then the sum equals to 15 and the value "5" of the sum on the lowest order digit may be used as the memory address, so that the fifth function is accessible.

C. If a transaction terminal such as an automatic cash dispenser or other banking system is operative only in the on-line mode, the function storage means may be built in the central computer and the determinations of an authorized card user may be performed therein.

D. The jump instructions between the main program in the ROM 17 and the function program in the RAM 18 may be replaced by well known instructions of CALL and RETURN with a proper modification in the addresses.

E. The kind of function stored in the function storage means may be selected in accordance with a desired level of security in the verification system. For example, the function may be a trigonometric function, quatric function, multiple integral function, or any other complicated function to provide more strict security.

F. In order to maintain data in strict confidence, it is preferrable to periodically change the addressed functions. To this end the constants i, j, k, and l stored in the constant area shown in FIG. 6 may be periodically changed, while the first data on the card must be revised ahead of the change in function value caused by the change in the value of the constants.

G. The function storage may be RAM, core memory, or ROM. If a volatile RAM is used as the storage, the RAM may be loaded with a function program by a non-volatile memory such as a magnetic cassette tape or the like each time the proper supply is switched on.

H. While the foregoing verification systems have been described for automatic banking applications such as an automatic cash dispenser, automatic cash depositor or the like, it should be apparent that the disclosed verification system is equally applicable to other fields. For example, the desired verification systems may be used in non-bank dispensers of articles other than money. In addition, the described verification systems may be useful in the area of access control for preventing unauthorized entry into security areas such as laboratories or the like.

While the invention has been described with reference to several preferred embodiments and variants thereof, the description is only exemplary as many modifications to the described systems can be made without departing from the spirit and scope of the invention. Accordingly, the invention is only limited by the attached claims.

What is claimed is:

1. A verification system for determining authorized use of a connected system, said verification system comprising:

reading means for reading first data from a card;

manually operable input means for entering second data into said verification system, said second data being different from said first data;

function storage means for storing a plurality of different functions, each having at least one variable, said function storage means being responsive to an address code formed from a portion of at least one of the read first data and the entered second data for looking up and generating a specific function;

calculating means for substituting a remaining portion of at least one of the first and second data not used in said address code into the variable of said generated specific function for calculating a function result; and checking means for checking whether a predetermined relationship exists between a further remaining portion of at least one of the first and second data not used in said address code and said calculated function result, and providing an access signal upon the existence of said predetermined relationship to allow use of said connected system.

2. The verification system according to claim 1, wherein said function storage means generates said specific function in response to an address code formed from a portion of the entered second data;

said calculating means substitutes a remaining portion of the second data not used in said address code into at least one variable of said generated specific function; and said checking means checks whether a predetermined relationship exists between at least a portion of the first data and said calculated function result from said calculating means.

3. The verification system according to claim 1, wherein said function storage means generates said specific function in response to an address code formed from a portion of each of the first and second data;

said calculating means substitutes a remaining portion of the first and second data not used in said address code into at least one variable of said generated specific function; and said checking means checks whether a predetermined relationship exists between a further remaining portion of the first and second data not used in said address code and said calculated function result from said calculating means.

4. The verification system according to claim 1, wherein said connected system is a bank transaction system.

5. The verification system according to claim 4, wherein said bank transaction system comprises at least one cash dispensing apparatus which is operable in response to the existence of said predetermined relationship in said checking means.

6. A verification system for determining authorized use of a connected system, said verification system comprising:

a card reader for reading first data from a card;

a manually operable keyboard for entering second data into said verification system, the second data being different from the first data;

a storage device for storing a plurality of different functions each having at least one variable, and in response to an address code formed by a portion of at least one of the read first and entered second data for generating a specific function; and a microprocessor for substituting a remaining portion of at least one of the first and second data not used in said address code into the variable of said generated specific function, for calculating a function result, for checking whether a predetermined relationship exists between a further remaining portion of at least one of the first and second data not used in said address code and said calculated function result, and for providing an access signal upon the existence of said predetermined relationship to allow use of said connected system.

7. A verification system for determining an authorized use of a connected system, said verification system comprising:

reading means for reading first data from a card;

manually operable input means for entering second data into said verification system, said second data being different from said first data;

function storage means for storing a plurality of different functions, each having at least one variable, said function storage means being responsive to an address code formed from a portion of at least one of the read first data and the entered second data for looking up and generating a specific function;

calculating means for substituting a portion of at least one of the first and second data into the variable of said generated specific function for calculating a function result; and checking means for checking whether a predetermined relationship exists between a portion of at least one of the first and second data and said calculated function result, and providing an access signal upon the existence of said predetermined relationship to allow use of said connected system.

* * * * *